(12) United States Patent
Kim et al.

(10) Patent No.: US 10,721,766 B2
(45) Date of Patent: Jul. 21, 2020

(54) METHOD AND DEVICE FOR DETERMINING LBT PRIORITY CLASS

(71) Applicant: LG ELECTRONICS INC., Seoul (KR)

(72) Inventors: Sangwon Kim, Seoul (KR); Seonwook Kim, Seoul (KR); Joonkui Ahn, Seoul (KR)

(73) Assignee: LG ELECTRONICS INC, Seoul (KR)

( * ) Notice: Subject to any disclaimer, the term of this patent is extended or adjusted under 35 U.S.C. 154(b) by 71 days.

(21) Appl. No.: 16/070,475

(22) PCT Filed: Feb. 2, 2017

(86) PCT No.: PCT/KR2017/001136
§ 371 (c)(1),
(2) Date: Jul. 16, 2018

(87) PCT Pub. No.: WO2017/135701
PCT Pub. Date: Aug. 10, 2017

(65) Prior Publication Data
US 2019/0053273 A1 Feb. 14, 2019

Related U.S. Application Data

(60) Provisional application No. 62/291,462, filed on Feb. 4, 2016.

(51) Int. Cl.
*H04W 28/02* (2009.01)
*H04W 72/04* (2009.01)
(Continued)

(52) U.S. Cl.
CPC ..... *H04W 74/008* (2013.01); *H04W 28/0205* (2013.01); *H04W 28/0247* (2013.01);
(Continued)

(58) Field of Classification Search
CPC ....... H04W 24/10; H04W 28/02–0294; H04W 72/02–14; H04W 74/002–0891;
(Continued)

(56) References Cited

U.S. PATENT DOCUMENTS

2012/0275381 A1* 11/2012 Kim ............... H04W 74/08
2017/0027002 A1* 1/2017 Yerramalli ........ H04W 74/0808
(Continued)

FOREIGN PATENT DOCUMENTS

WO  WO 2014/178502 A1  11/2014

OTHER PUBLICATIONS

"3rd Generation Partnership Project; Technical Specification Group Radio Access Network; Evolved Universal Terrestrial Radio Access (E-UTRA); Medium Access Control (MAC) protocol specification (Release 13)," 3GPP TS 36.321 V13.0.0 (Dec. 2015), 83 pages.
(Continued)

*Primary Examiner* — Timothy J Weidner
(74) *Attorney, Agent, or Firm* — Birch, Stewart, Kolasch & Birch, LLP

(57) ABSTRACT

Provided are a method for determining a listen-before-talk (LBT) priority class by a terminal in a wireless communication system and a device supporting same. The terminal can receive, from a network, mapping information between a logical channel and an LBT priority class and determine a particular LBT priority class on the basis of the received mapping information and a logical channel having data to be transmitted.

14 Claims, 9 Drawing Sheets

(51) Int. Cl.
*H04W 72/06* (2009.01)
*H04W 72/10* (2009.01)
*H04W 74/00* (2009.01)
*H04W 74/02* (2009.01)
*H04W 74/08* (2009.01)
*H04W 88/06* (2009.01)
*H04W 92/10* (2009.01)

(52) U.S. Cl.
CPC ... *H04W 28/0252* (2013.01); *H04W 28/0268* (2013.01); *H04W 72/042* (2013.01); *H04W 72/0493* (2013.01); *H04W 72/06* (2013.01); *H04W 72/10* (2013.01); *H04W 74/006* (2013.01); *H04W 74/02* (2013.01); *H04W 74/085* (2013.01); *H04W 74/0808* (2013.01); *H04W 74/0833* (2013.01); *H04W 74/0866* (2013.01); *H04W 74/0875* (2013.01); *H04W 88/06* (2013.01); *H04W 92/10* (2013.01)

(58) Field of Classification Search
CPC ........... H04W 88/02; H04W 88/04–10; H04W 92/10; H04W 92/18
See application file for complete search history.

(56) References Cited

U.S. PATENT DOCUMENTS

2018/0288805 A1\* 10/2018 Bhorkar ............ H04W 74/0816
2019/0014596 A1\* 1/2019 Yang ................ H04W 74/0808

OTHER PUBLICATIONS

"Multiplexing and assembly, Logical channel prioritization" 3GPP TS 36.321 V12.7.0 (Sep. 2015), 2 pages.
Blackberry UK Limited, "Downlink LBT Priority Classes," R1-157379, 3GPP TSG-RAN WG1 Meeting #83, Nov. 16-20, 2015, Anaheim, USA, 3 pages.
RAN1 et al., "LS on RAN1 agreements on LAA," R1-157905, 3GPP TSG RAN WG1 Meeting #83, Anaheim, USA, Nov. 15-22, 2015, 5 pages.
Samsung et al., "WF on MCOT for LBT priority classes," R1-157670, 3GPP TSG RAN WG1 #83, Anaheim, USA, Nov. 15-22, 2015, 5 pages.

\* cited by examiner

_US 10,721,766 B2_

METHOD AND DEVICE FOR DETERMINING LBT PRIORITY CLASS

CROSS REFERENCE TO RELATED APPLICATIONS

This application is the National Phase of PCT International Application No. PCT/KR2017/001136, filed on Feb. 2, 2017, which claims priority under 35 U.S.C. 119(e) to U.S. Provisional Application No. 62/291,462, filed on Feb. 4, 2016, all of which are hereby expressly incorporated by reference into the present application.

BACKGROUND OF THE INVENTION

Field of the Invention

The present invention relates to a wireless communication system and, more particularly, to a method for a user equipment to determine a listen-before-talk (LBT) priority class in a wireless communication system and an apparatus supporting the same.

Related Art

3GPP (3rd Generation Partnership Project) LTE (Long Term Evolution) that is an advancement of UMTS (Universal Mobile Telecommunication System) is being introduced with 3GPP release 8. In 3GPP LTE, OFDMA (orthogonal frequency division multiple access) is used for downlink, and SC-FDMA (single carrier-frequency division multiple access) is used for uplink. The 3GPP LTE adopts MIMO (multiple input multiple output) having maximum four antennas. Recently, a discussion of 3GPP LTE-A (LTE-Advanced) which is the evolution of the 3GPP LTE is in progress.

A wireless communication system may need to estimate an uplink channel or downlink channel to transmit/receive data, to achieve system synchronization, and to feed back channel information. In a wireless communication system environment, fading occurs by multipath time delay. A process of recovering a transmitted signal by compensating for a signal distortion caused by drastic environmental changes by fading is referred to as channel estimation. Further, it is needed to measure a channel state with respect to a cell to which a user equipment (UE) belongs or another cell. For channel estimation or channel state measurement, channel estimation is generally performed using a reference signal (RS) known between a transmitter and a receiver.

A UE may perform measurement using the following three methods.

1) Reference signal received power (RSRP): RSRP indicates the average received power of all resource elements (REs) carrying CRSs transmitted over the entire band. Here, the UE may measure the average received power of all REs carrying channel state information (CSI) RSs instead of CRSs.

2) Received signal strength indicator (RSSI): RSSI indicates received power measured over the entire band. RSSI includes all of a signal, interference, and thermal noise.

3) Reference symbol received quality (RSRQ): RSRQ indicates a channel quality indicator (CQI) and may be determined as RSRP/RSSI depending on a bandwidth or a sub-band. That is, RSRQ refers to signal-to-interference-plus-noise-ratio (SINR). Since RSRP does not provide sufficient mobility information, RSRQ may be used instead of RSRP in a handover or cell reselection process. RSRQ may be calculated by RSSI/RSSP. Alternatively, RSRQ may be calculated by N*RSSI/RSSP. Here, N may be a parameter (for example, the number of PRBs) or a function associated with a bandwidth in which RSSI is measured.

LTE in Unlicensed spectrum (LTE-U) or Licensed-Assisted Access using LTE (LAA) is a technology for aggregating a licensed band and an unlicensed band using a carrier aggregation (CA) by anchoring an LTE licensed band. A UE first accesses a network in the licensed band. A base station may aggregate the licensed band and the unlicensed band according to circumstances and offload the traffic of the licensed band to the unlicensed band.

LTE-U can provide improved mobility, security and communication quality by extending an advantage of LTE to an unlicensed band. Throughput can be increased because LTE has higher frequency efficiency than the existing radio access technology.

Unlike in a licensed band in which exclusive utilization is guaranteed, an unlicensed band is shared with various radio access technologies, such as the WLAN. Accordingly, each communication node obtains channel use in an unlicensed band based on a contention, which is called carrier sense multiple access with collision avoidance (CSMA/CA). Each communication node needs to check whether a channel is idle by performing channel sensing before it transmits a signal, which is called clear channel assessment (CCA).

SUMMARY OF THE INVENTION

A UE needs to perform an LBT procedure in order to transmit data in an unlicensed band. In this case, four channel access priority classes have already been defined, but how a UE determines a channel access priority class for uplink transmission has not yet been defined. Accordingly, a method of determining, by a UE attempting to perform uplink transmission in an unlicensed band, a channel access priority class and an apparatus supporting the same need to be proposed.

In an embodiment, there is provided a method for a UE to determine a listen-before-talk (LBT) priority class in a wireless communication system. The UE may include receiving mapping information between a logical channel and an LBT priority class from a network and determining a specific LBT priority class based on a logical channel having data to be transmitted and the received mapping information.

If all of logical channels having data to be transmitted correspond to a single LBT priority class, the specific LBT priority class may be determined as the single LBT priority class.

If a MAC PDU includes only a logical channel corresponding to a single LBT priority class, the specific LBT priority class may be determined as the single LBT priority class.

If a plurality of logical channels having data to be transmitted corresponds to a plurality of LBT priority classes and a MAC PDU includes a plurality of logical channels corresponding to the plurality of LBT priority classes, the UE may further include selecting a representative logical channel of the plurality of logical channels. The specific LBT priority class may be determined as an LBT priority class corresponding to the representative logical channel. A logical channel having a greatest amount of data may be selected as the representative logical channel from among the plurality of logical channels. A logical channel having the highest priority may be selected as the representative logical channel from among the plurality of logical channels.

If a plurality of logical channels having data to be transmitted corresponds to a plurality of LBT priority classes and a MAC PDU includes only a logical channel corresponding to a single LBT priority class, the specific LBT priority class may be determined per the plurality of logical channels. The specific LBT priority class may be determined as the single LBT priority class.

The UE may further include performing an LBT procedure based on the determined specific LBT priority class.

In another embodiment, there is provided a UE determining an LBT priority class in a wireless communication system. The UE includes a memory, a transceiver, and a processor connecting the memory and the transceiver. The processor may be configured to control the transceiver to receive mapping information between a logical channel and an LBT priority class from a network and to determine a specific LBT priority class based on a logical channel having data to be transmitted and the received mapping information.

A UE can determine an LBT priority class.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

For clarity, the following description will focus on LTE-A. However, technical features of the present invention are not limited thereto.

Figure 1:
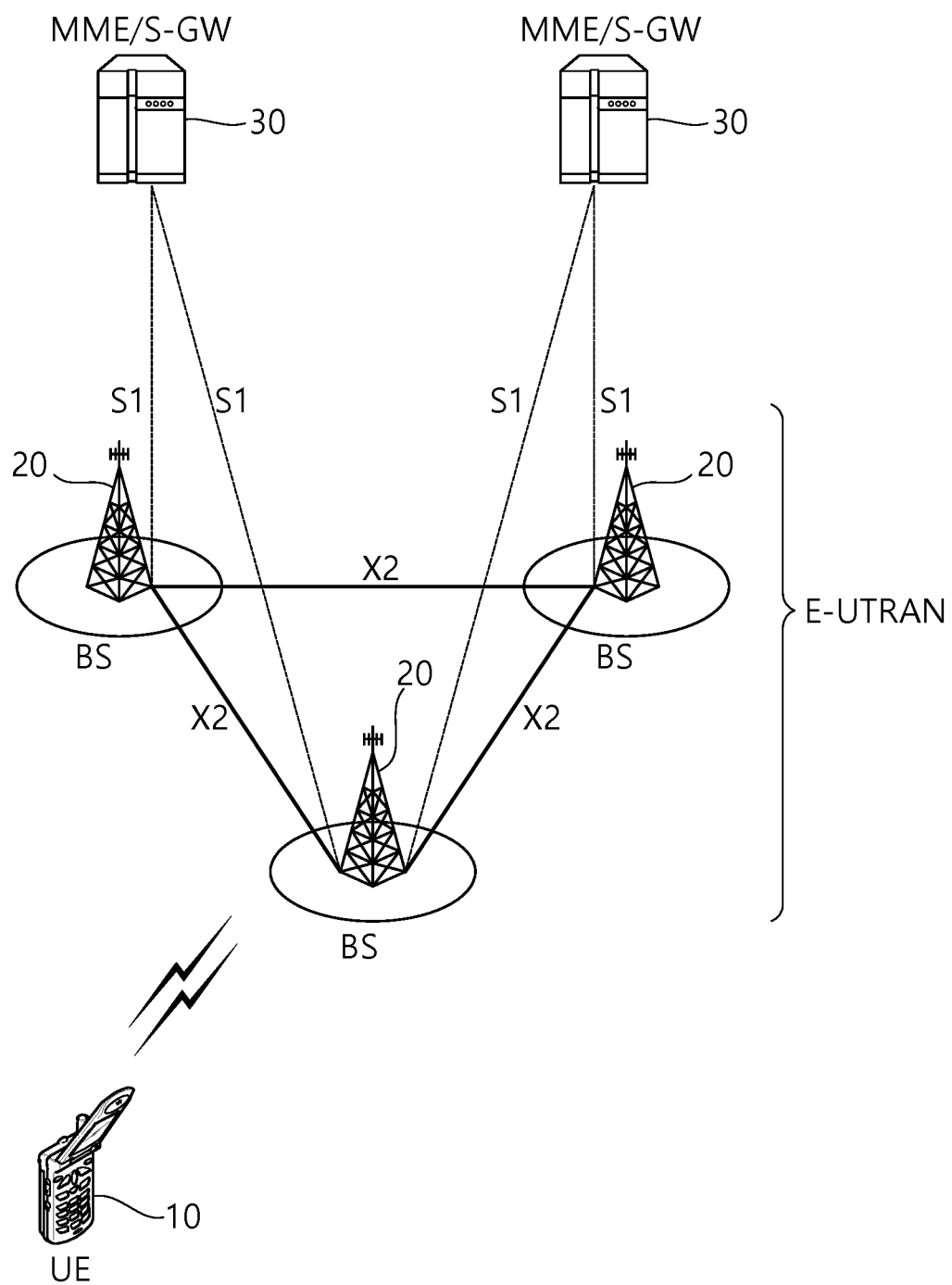
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 2:
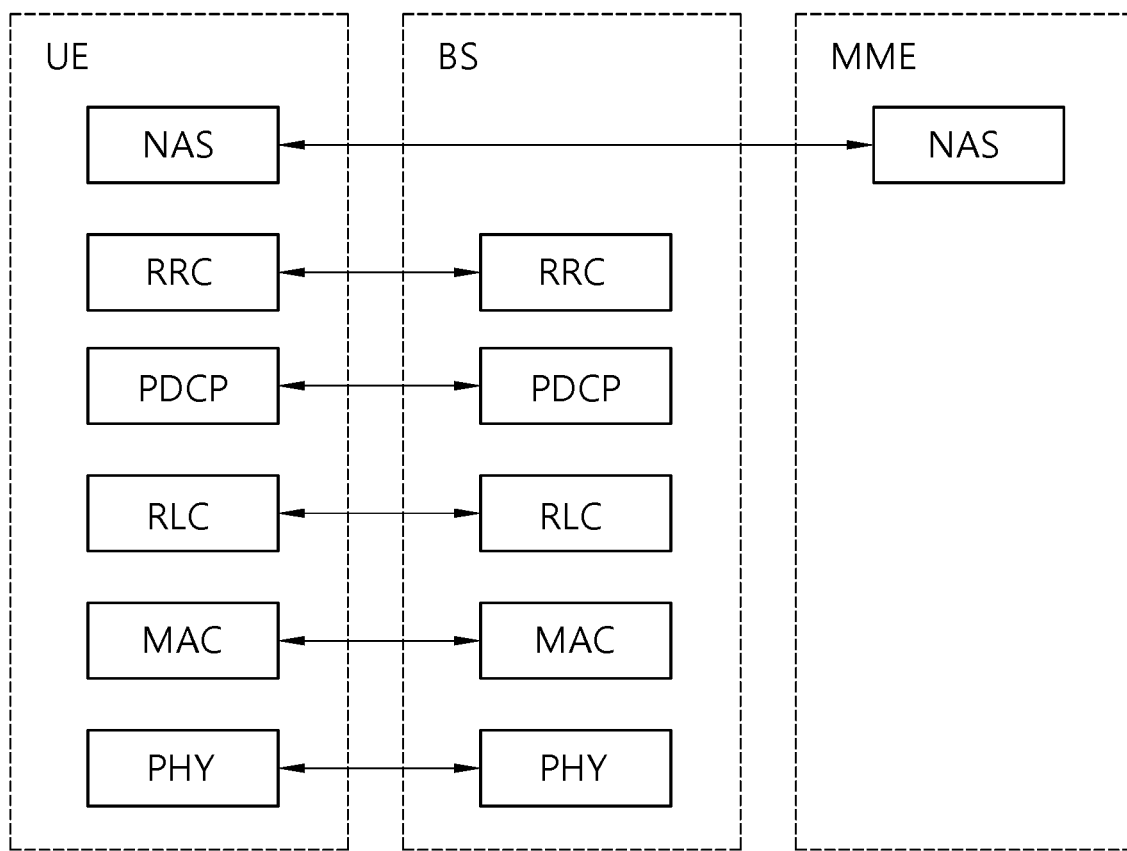
FIG. 2 shows a control plane of a radio interface protocol of an LTE system.
Figure 3:
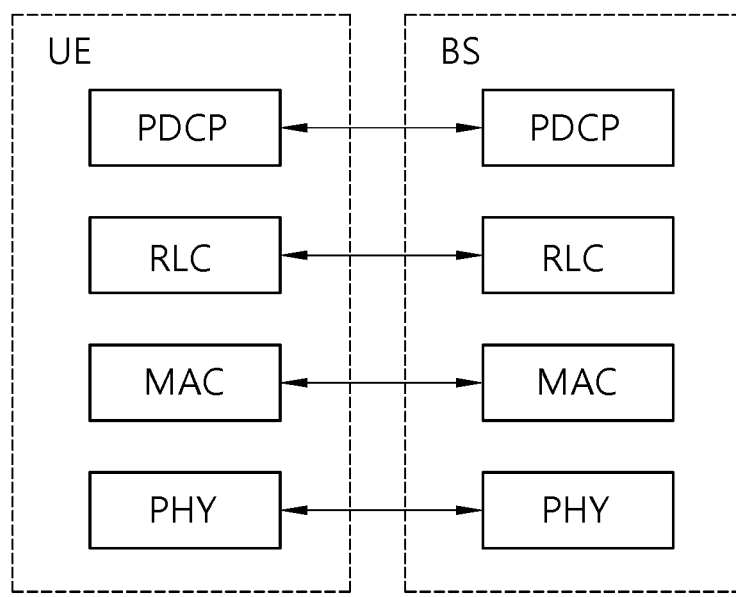
FIG. 3 shows a user plane of a radio interface protocol of an LTE system.

FIG. 2 shows a control plane of a radio interface protocol of an LTE system. FIG. 3 shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data is transferred between the MAC layer and the PHY layer through the transport channel. Between different PHY layers, i.e., the PHY layer of a transmitter and the PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from an upper layer in a radio section. In addition, to ensure a variety of quality of service (QoS) required by a radio bearer (RB), the RLC layer provides three operation modes. i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

A Non-Access Stratum (NAS) layer placed over the RRC layer performs functions, such as session management and mobility management.

Referring to FIG. 2, the RLC and MAC layers (terminated in the eNB on the network side) may perform functions such as scheduling, automatic repeat request (ARQ), and hybrid automatic repeat request (HARQ). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Referring to FIG. 3, the RLC and MAC layers (terminated in the eNB on the network side) may perform the same functions for the control plane. The PDCP layer (terminated in the eNB on the network side) may perform the user plane functions such as header compression, integrity protection, and ciphering.

Hereinafter, An RRC state of a UE and RRC connection procedure are described.

An RRC state indicates whether an RRC layer of the UE is logically connected to an RRC layer of the E-UTRAN. The RRC state may be divided into two different states such as an RRC connected state and an RRC idle state. When an RRC connection is established between the RRC layer of the UE and the RRC layer of the E-UTRAN, the UE is in RRC_CONNECTED, and otherwise the UE is in RRC_IDLE. Since the UE in RRC_CONNECTED has the RRC connection established with the E-UTRAN, the E-UTRAN may recognize the existence of the UE in RRC_CONNECTED and may effectively control the UE. Meanwhile, the UE in RRC_IDLE may not be recognized by the E-UTRAN, and a CN manages the UE in unit of a TA which is a larger area than a cell. That is, only the existence of the UE in RRC_IDLE is recognized in unit of a large area, and the UE must transition to RRC_CONNECTED to receive a typical mobile communication service such as voice or data communication.

In RRC_IDLE state, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell reselection. Also, in RRC_IDLE state, no RRC context is stored in the eNB.

In RRC_CONNECTED state, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED state, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE state, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion.

A paging message is transmitted over all cells belonging to the same tracking area. If the UE moves from one TA to another TA, the UE will send a tracking area update (TAU) message to the network to update its location.

When the user initially powers on the UE, the UE first searches for a proper cell and then remains in RRC_IDLE in the cell. When there is a need to establish an RRC connection, the UE which remains in RRC_IDLE establishes the RRC connection with the RRC of the E-UTRAN through an RRC connection procedure and then may transition to RRC_CONNECTED. The UE which remains in RRC_IDLE may need to establish the RRC connection with the E-UTRAN when uplink data transmission is necessary due to a user's call attempt or the like or when there is a need to transmit a response message upon receiving a paging message from the E-UTRAN.

To manage mobility of the UE in the NAS layer, two states are defined, i.e., an EPS mobility management-REGISTERED (EMM-REGISTERED) state and an EMM-DEREGISTERED state. These two states apply to the UE and the MME. Initially, the UE is in the EMM-DEREGISTERED state. To access a network, the UE performs a process of registering to the network through an initial attach procedure. If the attach procedure is successfully performed, the UE and the MME enter the EMM-REGISTERED state.

To manage a signaling connection between the UE and the EPC, two states are defined, i.e., an EPS connection management (ECM)-IDLE state and an ECM-CONNECTED state. These two states apply to the UE and the MME. When the UE in the ECM-IDLE state establishes an RRC connection with the E-UTRAN, the UE enters the ECM-CONNECTED state. When the MME in the ECM-IDLE state establishes an S1 connection with the E-UTRAN, the MME enters the ECM-CONNECTED state. When the UE is in the ECM-IDLE state, the E-UTRAN does not have context information of the UE. Therefore, the UE in the ECM-IDLE state performs a UE-based mobility related procedure such as cell selection or reselection without having to receive a command of the network. On the other hand, when the UE is in the ECM-CONNECTED state, mobility of the UE is managed by the command of the network. If a location of the UE in the ECM-IDLE state becomes different from a location known to the network, the UE reports the location of the UE to the network through a tracking area update procedure.

Figure 4:
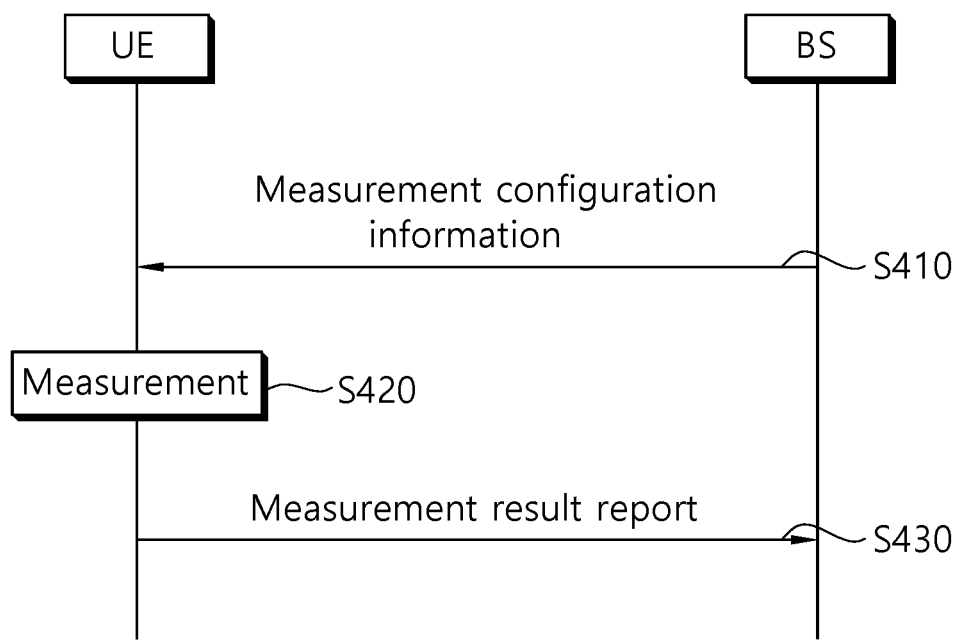
FIG. 4 shows a conventional method of performing measurement.

FIG. 4 shows a conventional method of performing measurement.

A UE receives measurement configuration information from a BS (S410). A message including the measurement configuration information is referred to as a measurement configuration message. The UE performs measurement based on the measurement configuration information (S420). If a measurement result satisfies a reporting condition included in the measurement configuration information, the UE reports the measurement result to the BS (S430). A message including the measurement result is referred to as a measurement report message.

The measurement configuration information may include the following information.

(1) Measurement object: The object is on which the UE performs the measurements. The measurement object includes at least one of an intra-frequency measurement object which is an object of intra-frequency measurement, an inter-frequency measurement object which is an object of inter-frequency measurement, and an inter-RAT measurement object which is an object of inter-RAT measurement. For example, the intra-frequency measurement object may indicate a neighboring cell having the same frequency as a frequency of a serving cell, the inter-frequency measurement object may indicate a neighboring cell having a different frequency from a frequency of the serving cell, and the inter-RAT measurement object may indicate a neighboring cell of a different RAT from an RAT of the serving cell.

(2) Reporting configuration: This includes a reporting criterion and a reporting format. The reporting criterion is used to trigger the UE to send a measurement report and can either be periodical or a single event description. The reporting format is a quantity that the UE includes in measurement reporting and associated information (e.g. number of cells to report).

(3) Measurement identity: Each measurement identity links one measurement object with one reporting configuration. By configuring multiple measurement identities, it is possible to link more than one measurement object to the same reporting configuration, as well as to link more than one reporting configuration to the same measurement object. The measurement identity is used as a reference number in measurement reporting. The measurement identify may be included in measurement reporting to indicate a specific measurement object for which the measurement result is obtained and a specific reporting condition according to which measurement reporting is triggered.

(4) Quantity configuration: One quantity configuration is configured per RAT type. The quantity configuration defines the measurement quantities and associated filtering used for all event evaluation and related reporting of that measurement type. One filter can be configured per measurement quantity.

(5) Measurement gaps: Measurement gaps are periods that the UE may use to perform measurements when downlink transmission and uplink transmission are not scheduled.

To perform a measurement procedure, the UE has a measurement object, a reporting configuration, and a measurement identity.

In 3GPP LTE, the BS can assign only one measurement object to the UE with respect to one frequency. Events for triggering measurement reporting are shown in the table 1. If the measurement result of the UE satisfies the determined event, the UE transmits a measurement report message to the BS.

TABLE 1

| Event | Reporting Condition |
| --- | --- |
| Event A1 | Serving becomes better than threshold |
| Event A2 | Serving becomes worse than threshold |
| Event A3 | Neighboring becomes offset better than PCell/PSCell |
| Event A4 | Neighboring becomes better than threshold |
| Event A5 | PCell/PSCell becomes worse than threshold1 and neighboring becomes better than threshold2 |
| Event A6 | Neighboring becomes offset better than SCell |
| Event B1 | Inter RAT neighboring becomes better than threshold |
| Event B2 | PCell becomes worse than threshold1 and inter RAT neighboring becomes better than threshold2 |
| Event C1 | CSI-RS resource becomes better than threshold |
| Event C2 | CSI-RS resource becomes offset better than reference CSI-RS resource |

The measurement report may include the measurement identity, a measured quality of the serving cell, and a measurement result of the neighboring cell. The measurement identity identifies a measurement object in which the measurement report is triggered. The measurement result of the neighboring cell may include a cell identity and a measurement quality of the neighboring cell. The measured quality may include at least one of reference signal received power (RSRP) and reference signal received quality (RSRQ).

Hereinafter, a carrier aggregation (CA) system will be described.

Figure 5:
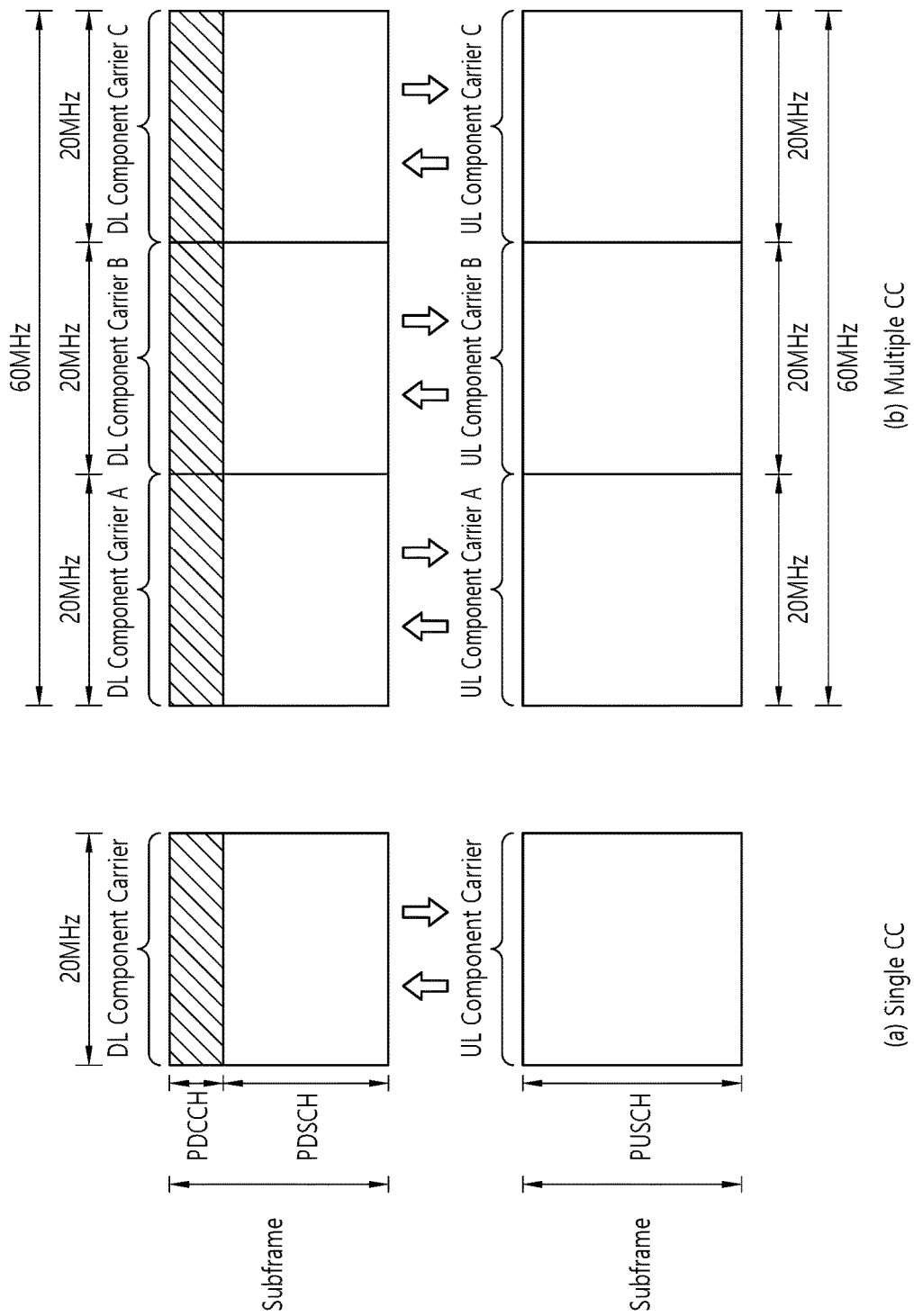
FIG. 5 shows a legacy single-carrier system and a carrier aggregation system.

FIG. 5 shows a legacy single-carrier system and a carrier aggregation system.

Referring to FIG. 5, only one carrier is supported for a UE in an uplink and a downlink in the single-carrier system. Although the carrier may have various bandwidths, only one carrier is assigned to the UE. Meanwhile, multiple component carriers (CCs) (i.e., DL CCs A to C and UL CCs A to C) can be assigned to the UE in the carrier aggregation (CA) system. A CC implies a carrier used in a carrier aggregation system, and can be simply referred to as a carrier. For example, three 20 MHz CCs can be assigned to allocate a 60 MHz bandwidth to the UE.

The carrier aggregation system can be divided into a contiguous carrier aggregation system in which carriers are contiguous to each other and a non-contiguous carrier aggregation system in which carriers are separated from each other. Hereinafter, when it is simply called the carrier aggregation system, it should be interpreted such that both cases of contiguous CCs and non-contiguous CCs are included.

A CC which is a target when aggregating one or more CCs can directly use a bandwidth that is used in the legacy system in order to provide backward compatibility with the legacy system. For example, a 3GPP LTE system can support a carrier having a bandwidth of 1.4 MHz, 3 MHz, 5 MHz, 10 MHz, 15 MHz, and 20 MHz, and a 3GPP LTE-A system can configure a broadband of 20 MHz or higher by using each carrier of the 3GPP LTE system as a CC. Alternatively, the broadband can be configured by defining a new bandwidth without having to directly use the bandwidth of the legacy system.

A frequency band of a wireless communication system is divided into a plurality of carrier frequencies. Herein, the carrier frequency implies a center frequency of a cell. Hereinafter, the cell may imply a downlink frequency resource and an uplink frequency resource. Alternatively, the cell may also imply combination of a downlink frequency resource and an optional uplink frequency resource. In general, if carrier aggregation (CA) is not considered, uplink and downlink frequency resources can always exist in pair in one cell. In order to transmit and receive packet data through a specific cell, the UE first has to complete a configuration of the specific cell. Herein, the configuration implies a state of completely receiving system information required for data transmission and reception for the cell. For example, the configuration may include an overall procedure that requires common physical layer parameters necessary for data transmission and reception, media access control (MAC) layer parameters, or parameters necessary for a specific operation in a radio resource control (RRC) layer. A cell of which configuration is complete is in a state capable of immediately transmitting and receiving a packet upon receiving only information indicating that packet data can be transmitted.

The cell in a state of completing its configuration can exist in an activation or deactivation state. Herein, the activation implies that data transmission or reception is performed or is in a ready state. The UE can monitor or receive a control channel (i.e., PDCCH) and a data channel (i.e., PDSCH) of an activated cell in order to confirm a resource (e.g., frequency, time, etc.) allocated to the UE.

The deactivation implies that transmission or reception of traffic data is impossible and measurement or transmission/reception of minimum information is possible. The UE can receive system information (SI) required for packet reception from a deactivated cell. On the other hand, the UE does not monitor or receive a control channel (i.e., PDCCH) and a data channel (i.e., PDSCH) of the deactivated cell in order to confirm a resource (e.g., frequency, time, etc.) allocated to the UE.

A cell can be classified into a primary cell, a secondary cell, a serving cell, etc.

The primary cell implies a cell which operates at a primary frequency, and also implies a cell which performs an initial connection establishment procedure or a connection re-establishment procedure or a cell indicated as the primary cell in a handover procedure. The secondary cell implies a cell which operates at a secondary frequency, and is configured when an RRC connection is once established and is used to provide an additional radio resource.

The serving cell is formed of a primary cell in the case of a UE in which a Carrier Aggregation (CA) has not been configured or to which a CA cannot be provided. If a CA has been configured for a UE, the term 'serving cell' is used to indicate a primary cell and one of all secondary cells or a set of a plurality of secondary cells. That is, a primary cell means one serving cell which provides security inputs and NAS mobility information in an RRC establishment or re-establishment state. At least one cell may be configured to form a set of serving cells along with a primary cell depending on the capabilities of UE. The at least one cell is called a secondary cell. Accordingly, a set of serving cells configured for one UE may be formed of only one primary cell or may be formed of one primary cell and at least one secondary cell.

A primary component carrier (PCC) denotes a CC corresponding to the primary cell. The PCC is a CC that establishes an initial connection (or RRC connection) with a BS among several CCs. The PCC serves for connection (or RRC connection) for signaling related to a plurality of CCs, and is a CC that manages a UE context which is connection information related to the UE. In addition, the PCC establishes a connection with the UE, and thus always exists in an activation state when in an RRC connected mode.

A secondary component carrier (SCC) denotes a CC corresponding to a secondary cell. That is, the SCC is a CC allocated to the UE in addition to the PCC. The SCC is an extended carrier used by the UE for additional resource allocation or the like in addition to the PCC, and can be in an activation state or a deactivation state.

A downlink CC corresponding to the primary cell is called a downlink primary component carrier (DL PCC), and an uplink CC corresponding to the primary cell is called an uplink primary component carrier (UL PCC). A DL CC corresponding to the secondary cell is called a DL secondary CC (SCC). A UL CC corresponding to the secondary cell is called a UL SCC.

The primary cell and the secondary cell have the following features.

First, the primary cell is used for PUCCH transmission. Second, the primary cell is always activated, whereas the secondary cell is activated/deactivated according to a specific condition. Third, when the primary cell experiences a radio link failure (RLF), RRC re-establishment is triggered. Fourth, the primary cell can be changed by a handover procedure accompanied by a random access channel (RACH) procedure or security key modification. Fifth, non-access stratum (NAS) information is received through the primary cell. Sixth, in case of an FDD system, the primary cell always consists of a pair of a DL PCC and a UL PCC. Seventh, for each UE, a different CC can be configured as the primary cell. Eighth, the primary cell can be replaced only through a handover, cell selection/cell reselection procedure. When adding a new secondary cell, RRC signaling can be used for transmission of system information of a dedicated secondary cell.

A DL CC can construct one serving cell. Further, the DL CC can be connected to a UL CC to construct one serving cell. However, the serving cell is not constructed only with one UL CC. Activation/deactivation of a CC is equivalent to the concept of activation/deactivation of a serving cell. For example, if it is assumed that a serving cell 1 consists of a DL CC 1, activation of the serving cell 1 implies activation of the DL CC 1. If it is assumed that a serving cell 2 is configured by connecting a DL CC 2 and a UL CC 2, activation of the serving cell 2 implies activation of the DL CC 2 and the UL CC 2. In this sense, each CC can correspond to a cell.

The number of CCs aggregated between a downlink and an uplink may be determined differently. Symmetric aggregation is when the number of DL CCs is equal to the number of UL CCs. Asymmetric aggregation is when the number of DL CCs is different from the number of UL CCs. In addition, the CCs may have different sizes (i.e., bandwidths). For example, if 5 CCs are used to configure a 70 MHz band, it can be configured such as 5 MHz CC(carrier #0)+20 MHz CC(carrier #1)+20 MHz CC(carrier #2)+20 MHz CC(carrier #3)+5 MHz CC(carrier #4).

Hereinafter, a reference signal (RS) is described.

In the wireless communication system, since data/signal is transmitted through a radio channel, the data/signal may be distorted on the radio during transmission. In order to normally receive the distorted signal, it is preferable that distortion of the received signal should be compensated using channel information. At this time, a reference signal (RS) known by both a transmitter and a receiver may be used by the transmitter and/or the receiver to detect channel information. The reference signal may be referred to as a pilot signal. When the transmitter transmits and receives data by using multiple antennas, it is preferable that a channel state between each transmitting antenna and each receiving antenna should be detected, whereby the receiver may receive the data exactly. At this time, it is preferable that each transmitting antenna of the transmitter has its individual reference signal to detect the channel state.

Downlink reference signals include a common reference signal (CRS) shared by all UEs in one cell, a UE-specific reference signal (UE-specific RS) only for a specific UE, a multimedia broadcast and multicast single frequency network (MBSFN) reference signal, a positioning reference signal (PRS), and a channel state information reference signal (CSI RS).

A transmitter may provide information for demodulation and channel measurement to a receiver using reference signals. The receiver (for example, a UE) may measure a channel state using a CRS and may feed an indicator relating to channel quality, such as a channel quality indicator (CQI), a precoding matrix index (PMI) and/or a rank indicator (RI), back to the transmitter (for example, a BS) according to the measured channel state. In the present specification, a CRS may be a cell-specific reference signal (cell-specific RS). The CRS is transmitted via all downlink subframes within a cell supporting PDSCH transmission. The CRS may be transmitted through antenna ports 0 to 3 and may be defined only for $\Delta f=15$ kHz. The CRS is disclosed in Section 6.10.1 of 3GPP TS 36.211 V10.1.0 (2011-03).

Meanwhile, a reference signal relating to the feedback of channel state information (CSI) may be defined as a CSI-RS. The CSI-RS may be relatively sparsely deployed in a frequency domain or time domain, and may be punctured in a data region of a normal subframe or an MBSFN subframe. If necessary, a CQI, a PMI, and an RI may be reported from a UE through CSI estimation.

A UE-specific RS may be transmitted to UEs through resource elements when the demodulation of data on a PDSCH is needed. A UE may receive the presence of a UE-specific RS through upper-layer signaling. The UE-specific RS is valid only when mapped to a corresponding PDSCH signal.

An MBSFN RS may be transmitted via a subframe allocated for MBSFN transmission. A PRS may be used for location estimation of a UE. A CSI RS is used for channel estimation for a PDSCH of a LTE-A UE.

Generally, an RS is transmitted as a sequence. Any sequence may be used as an RS sequence without particular restrictions. The RS sequence may be a phase shift keying (PSK)-based computer generated sequence. Examples of PSK include binary phase shift keying (BPSK), quadrature phase shift keying (QPSK), or the like. Alternatively, the RS sequence may be a constant amplitude zero auto-correlation (CAZAC) sequence. Examples of the CAZAC sequence include a Zadoff-Chu (ZC)-based sequence, a ZC sequence with cyclic extension, a ZC sequence with truncation, or the like. Alternatively, the RS sequence may be a pseudo-random (PN) sequence. Examples of the PN sequence include an m-sequence, a computer generated sequence, a Gold sequence, a Kasami sequence, or the like. In addition, the RS sequence may be a cyclically shifted sequence.

Hereinafter, a discovery reference signal (DRS) is described.

A microcell, a femtocell, and a picocell, which have small service coverage, may be installed at specified locations within the coverage of a macrocell with wide coverage. Such cells may be referred to as small cells. A small cell cluster is a set of geographically adjacent small cells. In most cases, one or two clusters are located in one macrocell (or sector) to provide high traffic for a UE.

To adjust inter-cell interference, the states of some small cells belonging to a small cell cluster may be changed (on/off) per appropriate time (dozens of milliseconds (ms)), thus performing inter-cell traffic load balancing. To reduce time to change the states of the small cells, even a turned-off small cell may transmit some signals (for example, a CRS or CSI RS) according a low period (for example, 40 ms) so that a UE may perform radio resource management (RRM) measurement regardless of the states of the small cells. That is, in order to increase downlink traffic, the on/off states of the small cells belonging to the small cell cluster may be changed. An off-state small cell, which has an increase in traffic load, quickly may need to change to an on state, while an on-state small cell, which has a low traffic load, may need to change to an off state. A method in which a small cell hands over the traffic loads of serving UEs to a neighboring small cell in the on state and changes to the off state may be considered. Since the small cell is in the off state, the neighboring small cell has a reduced level of interference, thus indirectly resulting in the effect of increasing downlink traffic.

An on-state small cell may transmit a control channel (for example, a PDCCH), a pilot (for example, a CRS or UE-specific RS), and data per subframe. It is preferable that an off-state small cell transmits no signal in view of interference management. However, when the state of a small cell is changed rapidly enough to quickly respond to a traffic load change, downlink traffic may be rather increased if no signal is transmitted. Thus, an off-state small cell transmits a minimal signal to quickly change to the on state. The minimal signal is newly introduced in Rel-12 and may be referred to as a DRS (discovery signal).

A DRS introduced in Rel-12 is configured using a combination of a Rel-8 primary synchronization signal (PSS), a Rel-8 secondary synchronization signal (SSS), and Rel-8 CRS port 0. If necessary, Rel-10 CSI-RS port 15 may be additionally configured. A UE may obtain coarse time synchronization and frequency synchronization with a small cell from the small cell through the PSS and the SSS. The UE may obtain accurate time synchronization and frequency synchronization using CRS port 0. If a DRS is configured using a CRS only, the UE may perform RRM measurement using the CRS only. If a CSI-RS is additionally used to configure a DRS, the UE may perform RRM measurement using only the CSI-RS based on synchronization obtained using a PSS/SSS/CRS.

A small cell may transmit a DRS regardless of the on state or off state. The DRS is transmitted to change the state of the small cell, and a quick state change of the small cell is greatly useful in view of interference management in a small cell cluster. When adjacent small cells transmit DRSs in sync, a UE receiving the DRSs may perform intra-frequency/inter-frequency RRM measurement with less battery consumption.

A DRS measurement timing configuration (DMTC) refers to time allowed for a UE to perform cell detection and radio resource measurement (RRM) based on a DRS, in which the UE may detect a plurality of DMTC-based cells with respect to one frequency. Thus, the UE may estimate the position of a DRS from a DMTC, and a DMTC may include a minimum period, an offset from a serving cell timing, and an available width, where the period may be set to at least 40 ms, 80 ms, or 160 ms in order that the UE performs a handover or RRM.

Hereinafter, an unlicensed band is described.

Figure 6:
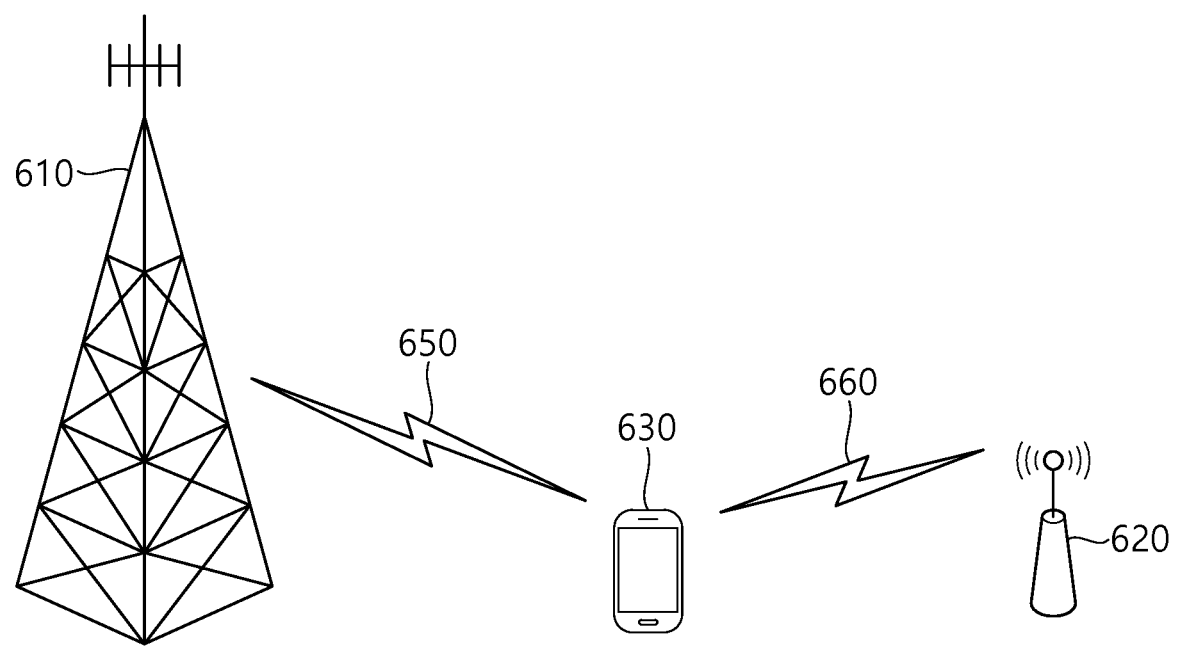
FIG. 6 shows an example of LTE services using an unlicensed band.

FIG. 6 shows an example of LTE services using an unlicensed band.

Referring to FIG. 6, a wireless device 630 sets up a connection with a first base station 610 and is supplied with services through a licensed band 650. For traffic offloading, the wireless device 630 may be provided with services through an unlicensed band 660 with a second base station 620.

The first base station 610 is a base station supporting the LTE system, whereas the second base station 620 can support other communication protocols, such as a wireless local area network (WLAN), in addition to LTE. The first base station 610 and the second base station 620 are aggregated into a carrier aggregation (CA) environment, and a specific cell of the first base station 610 may be a primary cell. Alternatively, the first base station 610 and the second base station 620 may be aggregated into a dual connectivity environment, and a specific cell of the first base station 610 may be a primary cell. In general, the first base station 610 having the primary cell has wider coverage than the second base station 620. The first base station 610 may be said to be a macro cell. The second base station 620 may be said to be a small cell, a femto cell or a micro cell. The first base station 610 may operate zero or more secondary cells along with the primary cell. The second base station 620 may operate one or more secondary cells. The secondary cell may be activated/deactivated by indication from the primary cell. The aforementioned example is merely an example. The first base station 610 may correspond to a primary cell and the second base station 620 may correspond to a secondary cell, and they may be managed by a single base station.

A licensed band is a band whose exclusive use by a specific communication protocol or a specific operator is guaranteed. An unlicensed band is a band in which various communication protocols coexist and shared use is guaranteed. The unlicensed band may include a 2.5 GHz band and/or a 5 GHz band used by a WLAN.

Basically, in the unlicensed band, channel acquisition through a contention between communication nodes is assumed. Accordingly, communication in the unlicensed band requires that other communication node does not transmit a signal by performing channel sensing. This is called a listen before talk (LBT), for convenience sake. If it is determined that other communication node does not transmit a signal, it is defined that clear channel assessment (CCA) has been confirmed.

The LBT is a method for a base station or UE to first check whether a corresponding channel is empty by performing carrier sensing before it performs transmission and then to perform the transmission. In LAA, in the case of the downlink, there are 25 us carrier sensing for discovery reference signal (DRS) transmission and 9 us carrier sensing for common user data transmission. If, as the results of the execution of carrier sensing, it is determined that a corresponding channel has not been occupied, a maximum number of transmission of data to be transmitted may be limited to $T_{mcot,p}$ (maximum channel occupation time (MCOT)) value changed based on priority defined in Table 2.

TABLE 2

| Channel Access Priority Class (p) | $m_p$ | $CW_{min,p}$ | $CW_{max,p}$ | $T_{mcot,p}$ | Allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

In Table 2, $CW_{min,p}$ is the smallest value of a content window, $CW_{max,p}$ is the greatest value of a content window, and $m_p$ is a consecutive slot. $CW_{min,p}$, $CW_{max,p}$, $m_p$ and Tmcot,p may be determined based on a channel access priority class (p).

As described above, an LBT procedure is necessary for data transmission in an unlicensed band. Furthermore, the four LBT priority classes have been defined in WiFi. In this specification, an LBT priority class and a channel access priority class may be used as the same concept. However, a method for an LTE UE to determine an LBT priority class for uplink transmission has not yet been defined. Hereinafter, according to an embodiment of the present invention, a method of a UE to determine an LBT priority class and an apparatus supporting the same are described.

Figure 7:
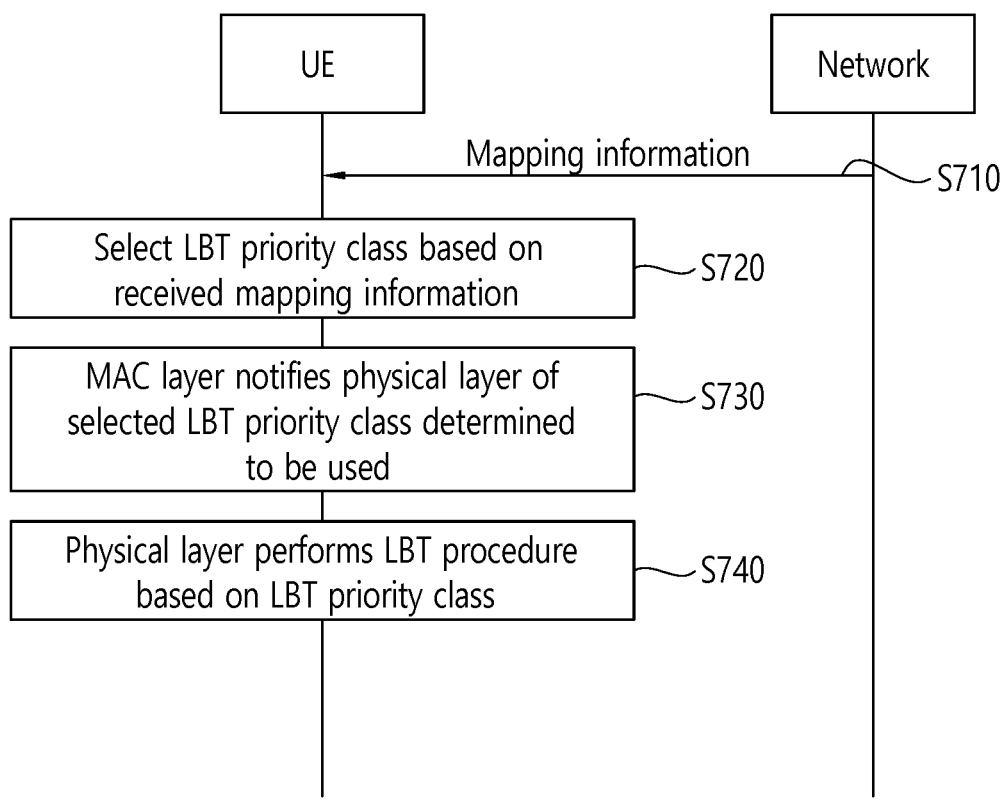
FIG. 7 shows a method for a UE to determine an LBT priority class and to perform an LBT procedure based on the determined LBT priority class according to an embodiment of the present invention.

FIG. 7 shows a method for a UE to determine an LBT priority class and to perform an LBT procedure based on the determined LBT priority class according to an embodiment of the present invention.

A UE may determine an LBT priority class based on a logical channel having data to be transmitted. Specifically, the UE may determine to use which LBT priority class in order to occupy an unlicensed frequency based on a logical channel having data to be transmitted.

Referring to FIG. 7, in step S710, the UE may receive mapping information from a network. The mapping information may be information including a mutual mapping relation between a logical channel and an LBT priority class.

One logical channel ID may be mapped to one LBT priority class. In this case, a logical channel configuration may include a corresponding LBT priority class. Alternatively, one logical channel priority may be mapped to one LBT priority class. Alternatively, one logical channel group may be mapped to one LBT priority class.

Some logical channel IDs may have a fixed LBT priority class. Accordingly, mapping information about some logical channel IDs may be omitted. Some logical channel priority may have a fixed LBT priority class. Accordingly, mapping information about the some logical channel priority may be omitted. Some logical channel groups may have a fixed LBT priority class. Accordingly, mapping information about the some logical channel groups may be omitted. For example, it is assumed that the logical channel ID of an SRB0 is 0, the logical channel ID of an SRB1 is 1, and the logical channel IDs of the SRB0 and SRB1 have a fixed LBT priority class. In this case, mapping information about the logical channel ID 0 and the logical channel ID 1 may be omitted. Accordingly, the mapping information may include only a logical channel ID 2 to a logical channel ID 10.

In step S720, the UE may select an LBT priority class based on the received mapping information. If the UE needs to perform uplink data transmission on an unlicensed frequency, the UE may determine to use which LBT priority class in order to occupy the unlicensed frequency based on the received mapping information.

(1) If all of logical channels having data to be transmitted belong to the same LBT priority class, a UE may select the LBT priority class. Alternatively, if a MAC PDU includes a logical channel belonging to the same LBT priority class, the UE may select the LBT priority class.

(2) If all of logical channels having data to be transmitted do not belong to the same LBT priority class and a MAC PDU includes a logical channel belonging to a different LBT priority class, a UE may select a representative logical channel. Furthermore, the UE may select an LBT priority class corresponding to the representative logical channel. The representative logical channel may be selected based on the amount of data buffered in each logical channel. For example, the UE may select a logical channel having the largest amount of data as the representative logical channel. The representative logical channel may be selected based on a logical channel priority. For example, the UE may select a logical channel having the highest priority as the representative logical channel.

(3) If all of logical channels having data to be transmitted do not belong to the same LBT priority class and a MAC PDU includes a logical channel belonging to the same LBT priority class, a UE may select an LBT priority class for each logical channel. In this case, the UE may perform an LBT procedure for each logical channel. Alternatively, if all of logical channels having data to be transmitted do not belong to the same LBT priority class and a MAC PDU includes a logical channel belonging to the same LBT priority class, the UE may select an LBT priority class corresponding to each logical channel group. In this case, the UE may perform an LBT procedure for each logical channel group.

Preferably, the network may explicitly notify the UE of the LBT priority class every TTI. In this case, a MAC entity may perform a logical channel prioritization (LCP) procedure on all of logical channels belonging to the determined LBT priority class. The LCP procedure has been described in Paragraph 5.4.3.1 of 3GPP TS 36.321 V12.7.0 (2015-09). For example, if an LBT priority class for a specific TTI is 1, the MAC entity may perform an LCP procedure on all of logical channels belonging to an LBT priority class 1.

After the MAC entity performs an LCP procedure on all of logical channels belonging to the determined LBT priority class, if there is a space in an MAC PDU, the MAC entity may perform an LCP procedure on a different logical channel. Alternatively, after the MAC entity performs an LCP procedure on all of logical channels belonging to the determined LBT priority class, if there is a space in the MAC PDU, the MAC entity may first perform an LCP procedure on a logical channel corresponding to a high priority class and then perform an LCP procedure on a different logical channel.

In step S730, if the transmission of uplink data is made possible in the RLC entity or PDCP entity, the MAC layer may notify the physical layer of the selected LBT priority class that has been determined to be used.

In step S740, the physical layer may perform an LBT procedure based on the LBT priority class in order to occupy the unlicensed frequency.

Figure 8:
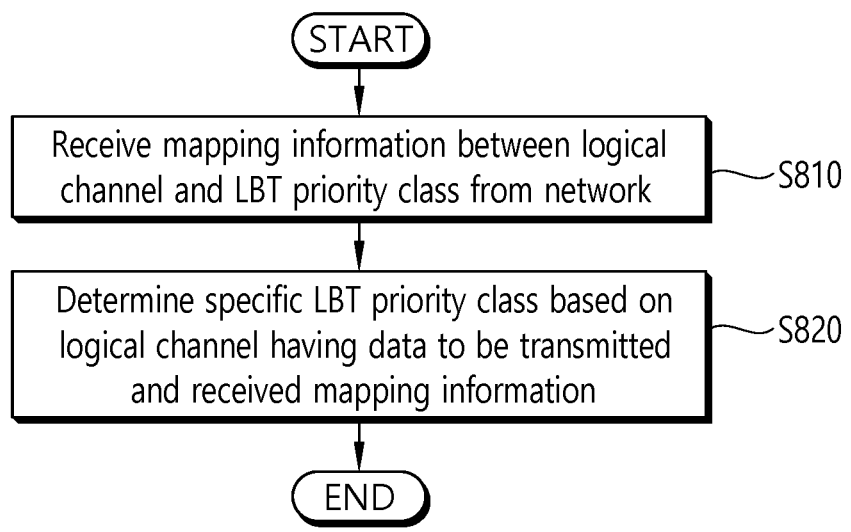
FIG. 8 is a flow chart showing a method for a UE to determine an LBT priority class according to an embodiment of the present invention.

FIG. 8 is a flow chart showing a method for a UE to determine an LBT priority class according to an embodiment of the present invention.

Referring to FIG. 8, in step S810, the UE may receive mapping information between a logical channel and an LBT priority class from a network.

In step S820, the UE may determine a specific LBT priority class based on a logical channel having data to be transmitted and the received mapping information.

If all of logical channels having data to be transmitted correspond to a single LBT priority class, the specific LBT priority class may be determined as the single LBT priority class. Alternatively, if a MAC PDU includes only a logical channel corresponding to a single LBT priority class, the specific LBT priority class may be determined as the single LBT priority class.

If a plurality of logical channels having data to be transmitted corresponds to a plurality of LBT priority classes and a MAC PDU includes a plurality of logical channels corresponding to a plurality of LBT priority classes, the UE may select a representative logical channel of the plurality of logical channels. The specific LBT priority class may be determined as an LBT priority class corresponding to the representative logical channel. A logical channel having the greatest amount of data may be selected as the representative logical channel from among the plurality of logical channels. Alternatively, a logical channel having the highest priority may be selected as the representative logical channel from among the plurality of logical channels.

If a plurality of logical channels having data to be transmitted corresponds to a plurality of LBT priority classes and a MAC PDU includes only a logical channel corresponding to a single LBT priority class, the specific LBT priority class may be determined per the plurality of logical channels. The specific LBT priority class may be determined as the single LBT priority class.

The UE may perform an LBT procedure based on the determined specific LBT priority class.

Figure 9:
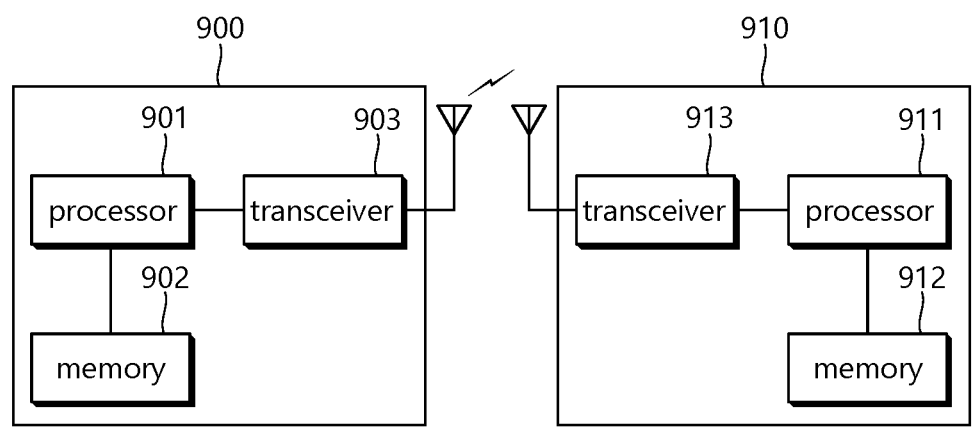
FIG. 9 is a block diagram illustrating a wireless communication system according to the embodiment of the present invention.

FIG. 9 is a block diagram illustrating a wireless communication system according to the embodiment of the present invention.

A BS 900 includes a processor 901, a memory 902 and a transceiver 903. The memory 902 is connected to the processor 901, and stores various pieces of information for driving the processor 901. The transceiver 903 is connected to the processor 901, and transmits and/or receives radio signals. The processor 901 implements proposed functions, processes and/or methods. In the above embodiment, an operation of the base station may be implemented by the processor 901.

A UE 910 includes a processor 911, a memory 912 and a transceiver 913. The memory 912 is connected to the processor 911, and stores various pieces of information for driving the processor 911. The transceiver 913 is connected to the processor 911, and transmits and/or receives radio signals. The processor 911 implements proposed functions, processes and/or methods. In the above embodiment, an operation of the UE may be implemented by the processor 911.

The processor may include an application-specific integrated circuit (ASIC), a separate chipset, a logic circuit and/or a data processing unit. The memory may include a read-only memory (ROM), a random access memory (RAM), a flash memory, a memory card, a storage medium and/or other equivalent storage devices. The transceiver may include a base-band circuit for processing a wireless signal. When the embodiment is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Various methods based on the present specification have been described by referring to drawings and reference numerals given in the drawings on the basis of the aforementioned examples. Although each method describes multiple steps or blocks in a specific order for convenience of explanation, the invention disclosed in the claims is not limited to the order of the steps or blocks, and each step or block can be implemented in a different order, or can be performed simultaneously with other steps or blocks. In addition, those ordinarily skilled in the art can know that the invention is not limited to each of the steps or blocks, and at least one different step can be added or deleted without departing from the scope and spirit of the invention.

The aforementioned embodiment includes various examples. It should be noted that those ordinarily skilled in the art know that all possible combinations of examples cannot be explained, and also know that various combinations can be derived from the technique of the present specification. Therefore, the protection scope of the invention should be determined by combining various examples described in the detailed explanation, without departing from the scope of the following claims.

What is claimed is:

1. A method performed by a wireless device in a wireless communication system, the method comprising:
receiving, from a network, mapping information informing a mapping relationship between a plurality of logical channels and a plurality of listen-before-talk (LBT) priority classes;
identifying, among the plurality of logical channels, a logical channel having uplink data for the wireless device to transmit;
determining, among the plurality of LBT priority classes, an LBT priority class mapped to the logical channel based on the mapping information; and
accessing a channel on an unlicensed frequency based on one or more LBT parameters related to the LBT priority class,
wherein the one or more LBT parameters comprise at least one of a minimum contention window size, a maximum contention window size, or a number of channel clear assessment (CCA) slots in a defer period.

2. The method of claim 1, wherein the LBT priority class comprises a LBT priority class mapped to all logical channels having uplink data for the wireless device to transmit.

3. The method of claim 1, wherein the LBT priority class comprises a LBT priority class mapped to logical channels composing a media access control (MAC) protocol data unit (PDU).

4. The method of claim 1, further comprising:
selecting a representative logical channel of logical channels having uplink data for the wireless device to transmit,
wherein the logical channels are mapped to LBT priority classes, and a media access control (MAC) protocol data unit (PDU) comprises logical channels mapped to the LBT priority classes.

5. The method of claim 4, wherein the LBT priority class comprises a LBT priority class mapped to the representative logical channel.

6. The method of claim 5, wherein the representative logical channel comprises a logical channel having a greatest amount of data among the logical channels.

7. The method of claim 5, wherein the representative logical channel comprises a logical channel having a highest priority among the logical channels.

8. The method of claim 1, wherein, based on a determination that logical channels having uplink data for the wireless device to transmit are mapped to LBT priority classes and a media access control (MAC) protocol data unit (PDU) is composed of logical channels mapped to a single LBT priority class, the LBT priority class is determined for each of the logical channels.

9. The method of claim 8, wherein the LBT priority class comprises the single LBT priority class.

10. A wireless device in a wireless communication system comprising:
   a memory;
   a transceiver; and
   at least one processor connected with the memory and the transceiver,
   wherein the at least one processor is configured to:
   control the transceiver to receive, from a network, mapping information informing a mapping relationship between a plurality of logical channels and a plurality of listen-before-talk (LBT) priority classes,
   identify, among the plurality of logical channels, a logical channel having uplink data for the wireless device to transmit,
   determine, among the plurality of LBT priority classes, an LBT priority class mapped to the logical channel based on the mapping information, and
   access a channel on an unlicensed frequency based on one or more LBT parameters related to the LBT priority class,
   wherein the one or more LBT parameters comprise at least one of a minimum contention window size, a maximum contention window size, or a number of channel clear assessment (CCA) slots in a defer period.

11. The UE of claim 10, wherein the LBT priority class comprises a LBT priority class mapped to all logical channels having uplink data for the wireless device to transmit.

12. The UE of claim 10, wherein the LBT priority class comprises a LBT priority class mapped to logical channels composing a media access control (MAC) protocol data unit (PDU).

13. The UE of claim 10, wherein the at least one processor is configured to select a representative logical channel of logical channels having uplink data for the wireless device to transmit, and
   wherein the logical channels are mapped to LBT priority classes, and a media access control (MAC) protocol data unit (PDU) comprises logical channels mapped to the LBT priority classes.

14. The UE of claim 13, wherein the LBT priority class comprises a LBT priority class mapped to the representative logical channel.

* * * * *